United States Patent
Acharya et al.

(10) Patent No.: US 9,713,009 B2
(45) Date of Patent: Jul. 18, 2017

(54) DUAL CONNECTIVITY OF USER EQUIPMENT TO MACRO AND SMALL CELL IN LONG TERM EVOLUTION SYSTEM

(71) Applicant: Hitachi, Ltd., Tokyo (JP)

(72) Inventors: Joydeep Acharya, Sunnyvale, CA (US); Long Gao, Santa Clara (CA); Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 14/773,913

(22) PCT Filed: Mar. 15, 2013

(86) PCT No.: PCT/IB2013/000925
§ 371 (c)(1),
(2) Date: Sep. 9, 2015

(87) PCT Pub. No.: WO2014/140667
PCT Pub. Date: Sep. 18, 2014

(65) Prior Publication Data
US 2016/0044514 A1    Feb. 11, 2016

(51) Int. Cl.
| | |
|---|---|
| H04W 72/04 | (2009.01) |
| H04W 16/10 | (2009.01) |
| H04W 24/02 | (2009.01) |
| H04W 24/08 | (2009.01) |
| H04W 48/16 | (2009.01) |
| H04W 84/04 | (2009.01) |

(52) U.S. Cl.
CPC .......... *H04W 16/10* (2013.01); *H04W 24/02* (2013.01); *H04W 24/08* (2013.01); *H04W 48/16* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2007/0184841 A1* | 8/2007 | Choi | H04W 88/085 455/444 |
| 2012/0201164 A1* | 8/2012 | Jongren | H04L 5/0048 370/252 |
| 2013/0053039 A1* | 2/2013 | Jorguseski | H04W 24/02 455/436 |

(Continued)

*Primary Examiner* — Brandon Renner
(74) *Attorney, Agent, or Firm* — Mattingly & Malur, PC

(57) ABSTRACT

A communications system includes a macro base station, a plurality of UEs (user equipment), a plurality of small cells, and a network through which the macro base station, the UEs, and the small cells communicate with each other, the small cells within a macro coverage area of the macro base station. The macro base station comprises a processor, a memory, and a small cell on/off module which is operable, for each small cell of the plurality of small cells, to: determine an interference metric for the small cell; if the determined interference metric meets a preset condition for the small cell, then determine a loss in signal strength to the UEs associated with the small cell caused by switching off the small cell; and judge whether to switch off the small cell based on at least one of the determined interference metric or the determined loss in signal strength.

16 Claims, 7 Drawing Sheets

(56) References Cited

U.S. PATENT DOCUMENTS

| | | | |
|---|---|---|---|
| 2013/0088986 A1* | 4/2013 | Xiao | H04W 72/0426 370/252 |
| 2013/0122913 A1* | 5/2013 | Agarwal | H04W 24/02 455/439 |
| 2014/0269313 A1* | 9/2014 | Liu | H04W 24/02 370/235 |

* cited by examiner

DUAL CONNECTIVITY OF USER EQUIPMENT TO MACRO AND SMALL CELL IN LONG TERM EVOLUTION SYSTEM

BACKGROUND OF THE INVENTION

The present invention relates generally to wireless systems and, more particularly, to dual connectivity of user equipment (UE or user) to macro and to small cell in long term evolution (LTE) systems.

In an LTE Rel-12 (Release 12) small cells scenario, there would be a dense deployment of small cells in a macro coverage area. The macro would be expected to handle the control plane transmission to the UEs and the data is transmitted to the UEs from the small cells. Small cells can be dynamically switched on and off to prevent interference.

BRIEF SUMMARY OF THE INVENTION

Exemplary embodiments of the invention provide a signaling framework to realize dual connectivity of the UE to the macro and small cell and a method for regular network reconfiguration to adapt to the dynamic changes in UE traffic. The signaling method proposed for dual connectivity is based on LTE Rel-10 carrier aggregation. The macro cell transmits the primary cell (PCell) and instructs each small cell to transmit discovery signals (DS) that are downlink pilot signals for measuring the downlink (DL) reference signal received power (RSRP) at the UE side. Based on UE feedback, the macro configures secondary cell (SCell) transmissions between a UE and a small cell. While doing so, the macro switches off certain small cells so that the interference is reduced and assigns the UEs that have strongest link gains to these small cells (which are switched off) to other small cells so that their QoS (Quality of Service) is not significantly reduced. The macro monitors the downlink QoS at each UE subsequently and also keeps track of the changes in the number of UEs in the network (i.e., the number of new UEs that have joined the system and number of UEs that have left the system). Based on these measurements, the macro cell decides when to reconfigure the network SCell connectivities by instructing the small cells to transmit DS and UEs to report RSRP values again.

In short, the invention presents ways to achieve dual connectivity of a UE to the macro and small cell and efficient operation of such a system. Dual connectivity is provided based on signal strength and interference caused by small cells and periodic network reconfiguration to adapt to dynamic changes in UE traffic. The invention will enable deployment of small cell systems with dual connectivity at the UE end. As a result, this invention will enable dual connectivity and efficient operation of small cell heterogeneous networks.

An aspect of the present invention is directed to a macro base station in a communications system which includes the macro base station, a plurality of UEs (user equipment), a plurality of small cells, and a network through which the macro base station, the UEs, and the small cells communicate with each other, the plurality of small cells within a macro coverage area of the macro base station. The macro base station comprises a processor, a memory, and a small cell on/off module which is operable, for each small cell of the plurality of small cells, to: determine an interference metric for the small cell; if the determined interference metric meets a preset condition for the small cell, then determine a loss in signal strength to the UEs associated with the small cell caused by switching off the small cell; and judge whether to switch off the small cell based on at least one of the determined interference metric or the determined loss in signal strength.

In some embodiments, for each UE i, the small cell on/off module is operable to determine a small cell j of the plurality of small cells that has a highest downlink reference signal received power (DL RSRP) value to the UE i, and the UE i would normally connect to the small cell j given by $M(i) = \text{argmax}_j S(UEi, SCj)$, where UEi stands for UE i and SCj stands for small cell j. For each small cell j, the small cell on/off module is operable to determine a set of UEs i, which would normally connect to the small cell j based on highest DL RSRP value, the set of UEs being denoted by $N(j) = \{i | j = M(i)\}$. For each small cell j, the small cell on/off module is operable to check if the set of UEs N(j) is empty or not and, if empty, then to switch off the small cell j.

In specific embodiments, if the set of UEs N(j) is not empty, then the small cell on/off module is operable to define the interference metric for small cell j as $I(j) = \Sigma_{i \notin N(j)} S(UEi, SCj)$, which sums up the DL RSRP values to all UEs which are not in N(j). The small cell on/off module is operable to check if the interference metric I(j) for the small cell j is above a preset first threshold and, if not, then to judge that the small cell j is not to be switched off.

In some embodiments, if the interference metric I(j) for the small cell j is above the preset first threshold, the small cell on/off module is operable to calculate the loss in signal strength caused by switching off the small cell j for each UE i, which is given by $$a(i) = |S(UEi, SCj) - \max_{k \neq j} S(UEi, SCk)|;$$

wherein if the calculated loss in signal strength is less than a preset second threshold, the small cell on/off module is operable to judge that the small cell j is to be switched off. If the calculated loss in signal strength is not less than the preset second threshold, the small cell on/off module is operable to judge that the small cell j is not to be switched off.

In specific embodiments, the macro base station further comprises a radio RRM (Radio Resource Management) module operable (i) to send a message to the plurality of small cells instructing the small cells to broadcast discovery signals which are received by RRM modules in the UEs, the RRM module in each UE i calculating the received DL RSRP value from each small cell j, as denoted by S(UEi, SCj), and (ii) to receive the calculated DL RSRP value denoted by S(UEi, SCj).

In some embodiments, the macro base station further comprises a network monitoring module being operable, based on (i) a differential change in a number of UEs in the communications system in a preset period of time and (ii) a number of UEs whose QoS (quality of service) is below a preset QoS threshold, to decide when to reconfigure the network which includes instructing small cells to broadcast discovery signals, determining the interference metric for the small cell, determining the loss in signal strength if the determined interference metric meets the preset condition, and judging whether to switch off the small cell.

In specific embodiments, the network monitoring module is operable to determine a number of new UEs that have joined the communications system at time t at t>T(k) where T(k) is time of kth network configuration time, the number of new UEs being m(t); determine a number of UEs that have left the communications system at time t, the number of UEs that have left being n(t); for time t, define the differential change in the number of UEs in the communications system as m(t)+n(t); and sum the differential change m(t)+n(t) for all time instants from T(k) to t to obtain a UE differential metric D(t). The small cell on/off module is operable to determine, from channel state information and hybrid ARQ (Automatic Repeat Request) ACK/NACK (Acknowledge receipt of data/Not Acknowledged) information of already scheduled transmissions for each UE, the number of UEs whose QoS is below the preset QoS threshold at time t, as denoted by Q(t).

In some embodiments, the macro base station further comprises a network reconfiguration module operable to determine a weighing parameter $\beta$ between 0 and 1 to give relative importance to D(t) and Q(t) and a threshold $\lambda_\beta$, and, if $\beta D(t)+(1-\beta)Q(t) > \lambda_\beta$, to reconfigure the network.

In accordance with another aspect of the invention, a communications system comprises: a macro base station; a plurality of UEs (user equipment); a plurality of small cells; and a network through which the macro base station, the UEs, and the small cells communicate with each other, the plurality of small cells within a macro coverage area of the macro base station. The macro base station includes a processor, a memory, and a small cell on/off module which is operable, for each small cell of the plurality of small cells, to: determine an interference metric for the small cell; if the determined interference metric meets a preset condition for the small cell, then determine a loss in signal strength caused by switching off the small cell; and judge whether to switch off the small cell based on at least one of the determined interference metric or the determined loss in signal strength.

Another aspect of this invention is directed to a method for providing connectivity in a communications system which includes a macro base station, a plurality of UEs (user equipment), a plurality of small cells, and a network through which the macro base station, the UEs, and the small cells communicate with each other, the plurality of small cells within a macro coverage area of the macro base station, the macro base station comprising a processor and a memory. The method comprises, for each small cell of the plurality of small cells: determining an interference metric for the small cell; if the determined interference metric meets a preset condition for the small cell, then determining a loss in signal strength caused by switching off the small cell; and judging whether to switch off the small cell based on at least one of the determined interference metric or the determined loss in signal strength.

These and other features and advantages of the present invention will become apparent to those of ordinary skill in the art in view of the following detailed description of the specific embodiments.

BRIEF DESCRIPTION OF THE DRAWINGS

FIG. 6 is an illustration of a scenario in which C1='NO' (interference metric I(j) is below threshold Th1) and small cell is switched ON.

FIG. 7 is an illustration of a scenario in which C1='YES' and C2='NO' (loss in signal strength by switching off small cell is not less than threshold Th2) and small cell is switched ON.

DETAILED DESCRIPTION OF THE INVENTION

Figure 1:
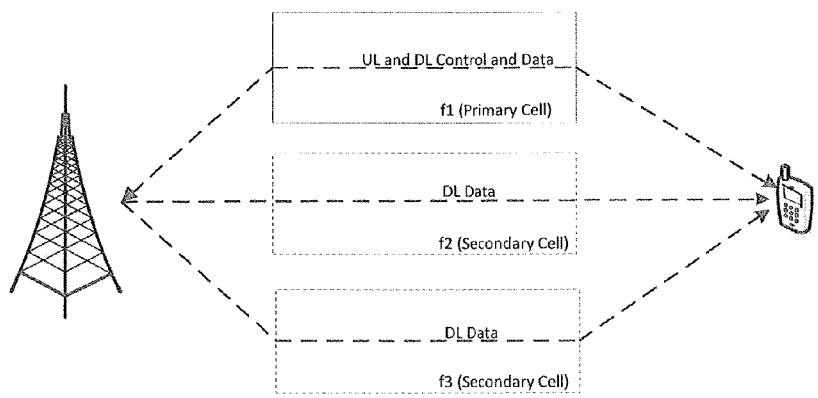
FIG. 1 shows a logical diagram of LTE Rel-10 carrier aggregation by which a UE can transmit and receive data over multiple LTE carriers.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for dual connectivity of user equipment (UE) to macro and to small cell in long term evolution (LTE) systems.

FIG. 1 shows a logical diagram of LTE Rel-10 carrier aggregation by which a UE can transmit and receive data over multiple LTE carriers. See Z. Shen et. al., "Overview of 3GPP LTE-advanced carrier aggregation for 4G wireless communications," IEEE Communications Magazine, February 2012. This leads to better utilization of fragmented chunks of spectrum and also can potentially improve the data rate at a UE by increasing its allocated spectrum from Rel-8 levels. In carrier aggregation, only one carrier (known as the primary cell or PCell) is responsible for all downlink control plane transmission. Downlink data plane transmissions take place from the PCell and other carriers known as secondary cells (or SCells). The uplink data and control transmissions from the UE take place only on the uplink PCell. In FIG. 1, the LTE carrier f1 is the PCell and carriers f2 and f3 are SCells.

Figure 2:
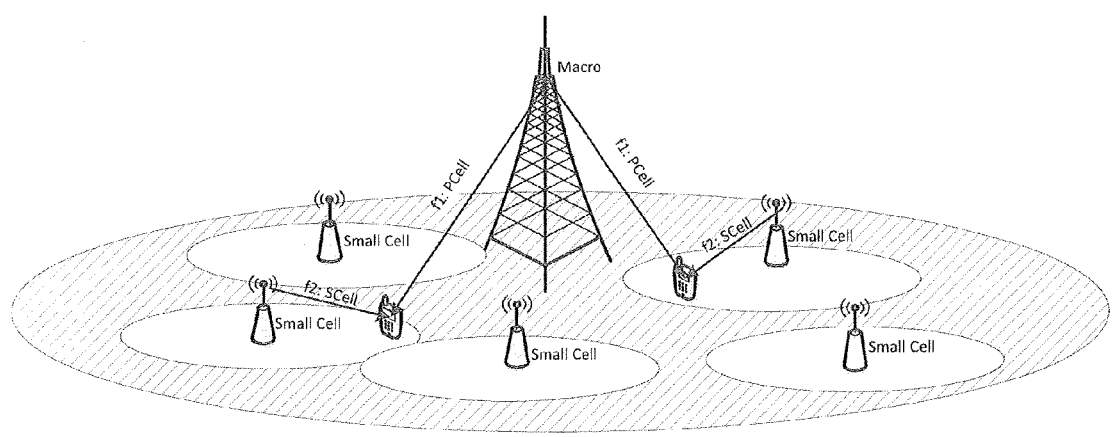
FIG. 2 shows a small cell deployment situation with C/U split.

FIG. 2 shows a small cell deployment situation with C/U split. LTE Rel-12 has introduced the possibility of dual connectivity of a UE to two separate base stations. See RWS-120010, "Requirements, Candidate Solutions and Technology Roadmap for LTE Rel-12 Onward," NTT DoCoMo, 3GPP Workshop on Rel-12 and onwards, Ljubljana, Slovenia, Jun. 11-12, 2012. The typical network deployment for this situation is in a large macro coverage area with many pico cells (called small cells) present in it. A macro base station has a higher (typically substantially higher) transmission power/coverage than a small cell. In this example, the small cells are within the macro coverage area of the macro base station. The UE is connected to the macro cell for control plane transmission and to the small cells for data plane transmission. In this way, the UE receives high rate data from the closest small cell and handover is avoided when the UE changes a small cell as it is still receiving the control plane transmission from the macro. This concept called C/U split is based on Rel-10 carrier aggregation which is shown in FIG. 1. The PCell is transmitted from the macro and the small cells transmit SCells. Thus the UE connects to the macro based on downlink (DL) signal strength or reference signal received power (RSRP) measurements and, after this, the macro configures some of the small cells as SCells for the UE.

Given a small cell situation as shown in FIG. 2 with C/U split, there are some important issues about how to operate such a network. In this disclosure, we address the following issues:

(1) For a given UE how does the macro decide which small cells to which to connect the UE (i.e., which small cells to configure as SCells)?

(2) For a dense deployment of small cells, some small cells might have very few UEs in their coverage area. Dynamic ON/OFF switching of some of these small cells can reduce interference in the system while not sacrificing on some individual UE performances. How does the macro perform ON/OFF switching of small cells?

(3) How frequently does the macro perform the dynamic ON/OFF switching and UE association to small cells?

Figure 3:
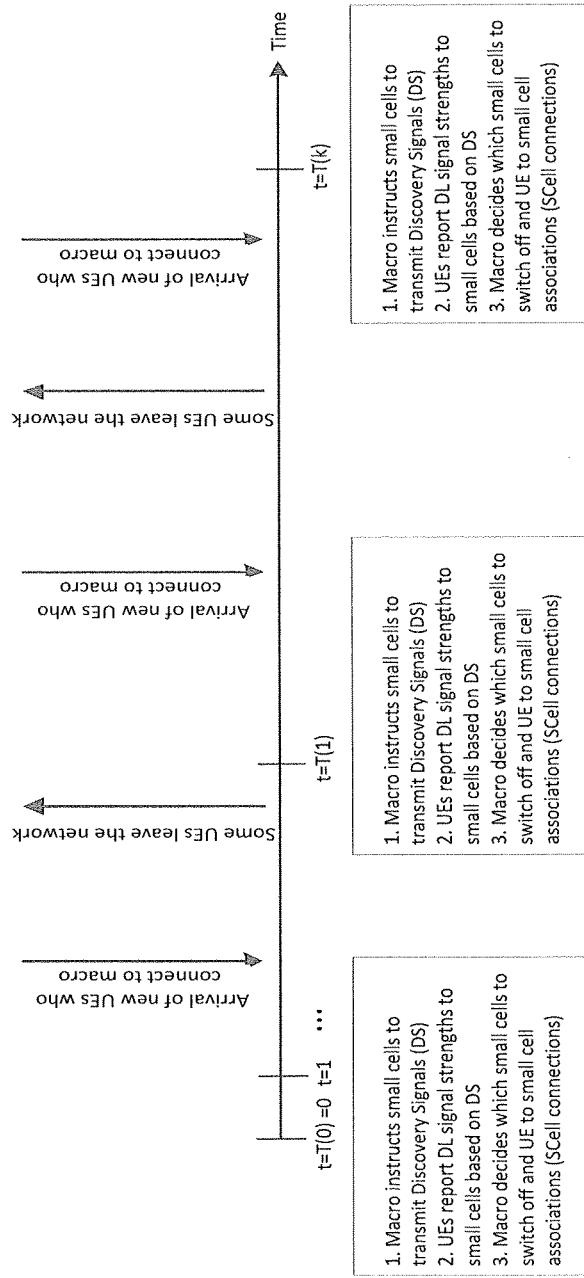
FIG. 3 shows an example of a timeline diagram of the functioning of a small cell network.

FIG. 3 shows an example of a timeline diagram of the functioning of a small cell network. This high level timeline diagram for efficient operation of a small cell system has the following parts:

(1) At initial time t=T(0)=0, the UEs in the system connect to the macro cell which acts as the PCell of these UEs.

(2) At initial time t=T(0)=0, the macro configures the network (network configuration time), i.e., the macro instructs the small cells to transmit pilot signals called discovery signals (DS) for downlink signal strength (i.e., RSRP) and channel quality measurements by the UE. Based on these measurements, the macro decides which small cells to assign to which UEs (as SCells).

(3) After this is done, at each subsequent time instant (t=2, t=3, so on), some UEs may leave the system. Some new UEs may arrive at the system. These new UEs will be connected only to the macro. No dual connectivity is possible for these new UEs.

(4) The macro monitors the network continuously and, based on this, decides when to configure the network again (reconfiguration). When the macro decides to configure the network again, it instructs all small cells to transmit DS and the macro then configures SCell connections. The instants when the network is configured are given by T(0), T(1), T(2) etc.

The following describes proposed detailed signaling and algorithms to realize the high level functionalities proposed in the timeline.

Figure 4:
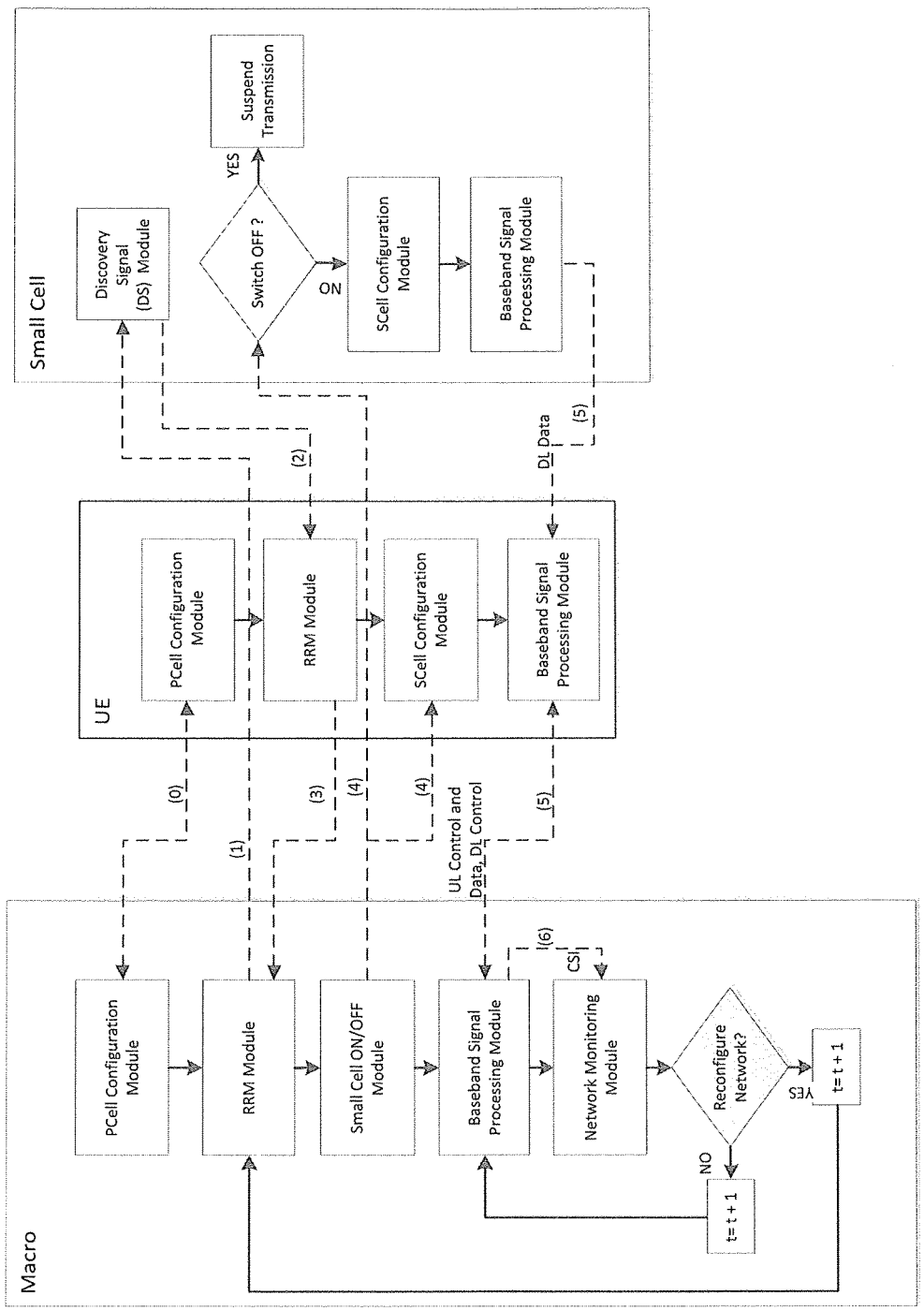
FIG. 4 shows an example of a detailed block diagram of a communications system.

FIG. 4 shows an example of a detailed block diagram of a communications system. It shows block diagrams of the macro, small cell, and UE. The system block diagram can be understood by the sequence of the signaling (0) to (6) between the various modules of the system.

(0) In the beginning t=0 (corresponding to t=T(0)=0 in FIG. 3), the UEs and macro undergo a connection procedure. All UEs connect to the macro and the macro is the PCell of all UEs.

(1) The RRM (Radio Resource Management) module in the macro cell sends a message to the small cell instructing it to broadcast the discovery signals (DS).

(2) The small cells transmit DS which are received by all the RRM Modules in all the UEs.

(3) The RRM module of each UE calculates the received downlink signal strength (i.e., RSRP) from each small cell. Let the RSRP from small cell (SC) j and UE i be denoted by S(UEi, SCj). The RRM module at each UE transmits these values (or a subset of the strongest values to reduce overhead) to the macro.

(4) The Small Cell ON/OFF module receives the S(UEi, SCj) values from the RRM module of the macro and computes which small cells should be dynamically switched off. The details of this module are presented in FIG. 5. This information is transmitted to the Switch ON/OFF module at the small cell. The small cells that are switched on are configured as SCells for the various UEs. This information is transmitted to the SCell Configuration module at the UEs and also the SCell Configuration module at the corresponding small cells.

(5) Subsequently, the communication process happens between the UE and the macro/small cells. The macro, being the PCell, transmits the DL control plane. The small cells and macro transmit DL data plane. UL control and data are sent to the macro by the UE.

(6) The UL control transmitted by the UE contains information about the channel state information and hybrid ARQ ACK/NACK information of already scheduled transmissions, from which the quality of service (QoS) experienced by the UE can be determined by the macro. This information for all UEs is input to the Network Monitoring module, which decides if the network needs to be reconfigured or not. The details of the Network Monitoring module and Reconfiguration module ("Reconfigure Network?" in FIG. 4) are provided in FIGS. 9 and 10. If the network does not need to be reconfigured, the macro carries on normal UL and DL control and data communications and step (6) is repeated at the next time instant. If the network needs to be reconfigured, the macro goes back to step (1).

Figure 5:
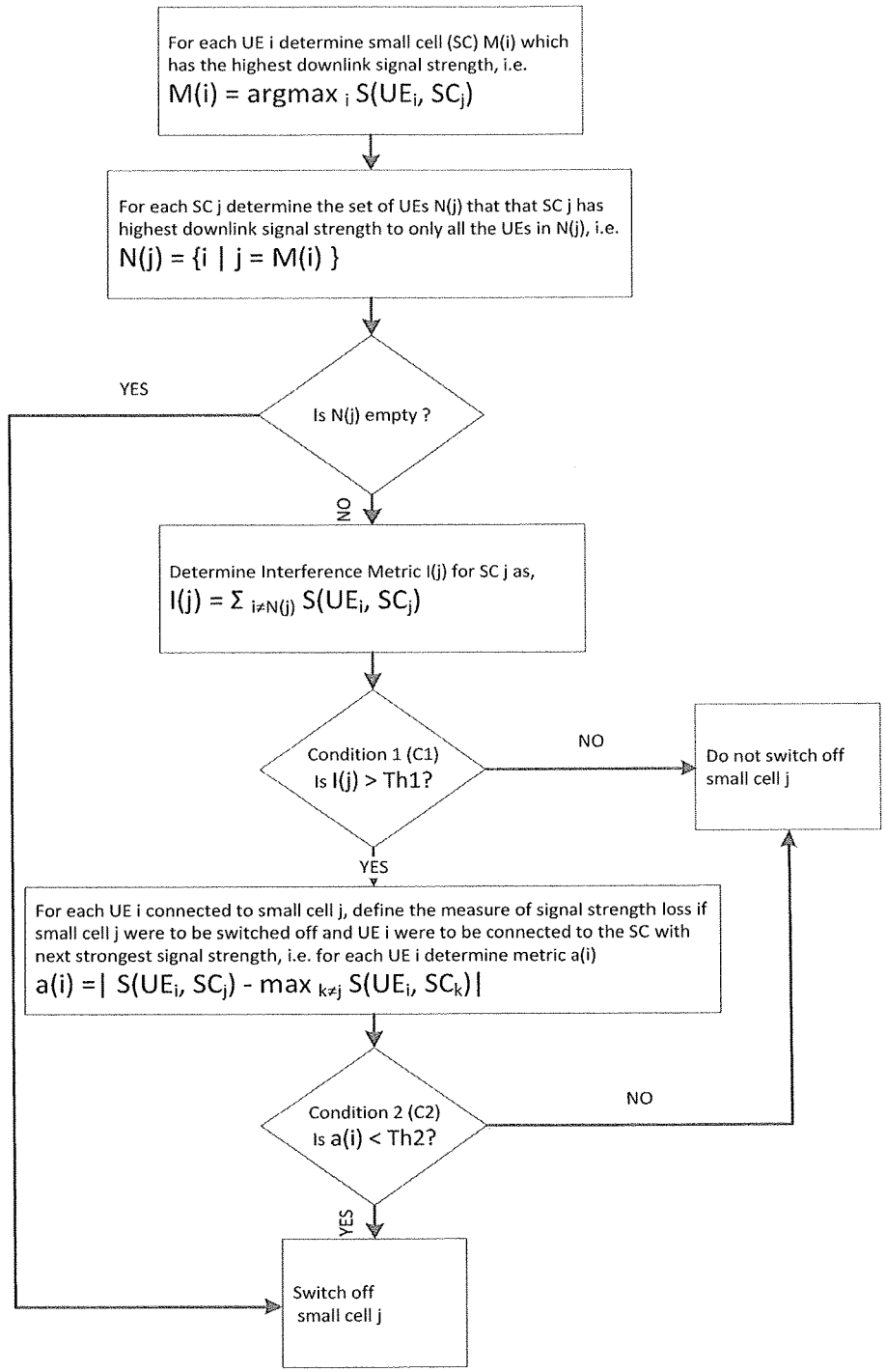
FIG. 5 shows an example of a detailed flow diagram of the Small Cell ON/OFF module of the macro.

FIG. 5 shows an example of a detailed flow diagram of the Small Cell ON/OFF module of the macro. It has the following steps:

(1) For each UE i, the module determines the small cell j that has the highest RSRP strength to it. This is given by $M(i) = \text{argmax}_j S(UEi, SCj)$. UE i would normally connect to small cell M(i). However, this may change as the macro may switch off small cell M(i). The next steps show when and how this could be done.

(2) For each small cell j, the module now determines the set of UEs i, which would normally connect to it based on highest DL RSRP value. This is denoted by N(j) and given by $N(j) = \{i | j = M(i)\}$.

(3) For each small cell j, the module checks if set N(j) is empty or not. If N(j) is empty, then the module switches off the small cell j.

(4) If set N(j) is non-zero, then the module defines the interference metric for small cell j as $I(j) = \Sigma i \notin N(j) S(UEi, SCj)$. Basically this sums up the RSRP values to all those UEs which are not in N(j), i.e., UEs which are associated with some other small cell and thus small cell j would cause interference to them. Note that the proposed I(j) metric is proportional to the total interference to all such UEs.

(5) The module defines condition 1 (C1) and checks if this interference metric I(j) is above a certain threshold Th1. If not, then the module does not switch off the small cell. This threshold Th1 is determined by the macro based on QoS considerations. A high threshold on tolerated interference given by Th1 would reduce the chances of switching off a small cell.

(6) If the interference metric is above a certain threshold (the interference metric meets preset condition 1), then there is a possibility that the small cell j may have to be switched off. If this happens, then the UEs in N(j) would have to be reassigned to the small cells to which they had the next strongest RSRP value. Consider each of these UEs i and consider the loss in signal strength due to this reassignment. The loss for UE i (in N(j)) is given by $$a(i) = |S(UEi, SCj) - \max_{k \neq j} S(UEi, SCk)|.$$

(7) The idea is that if this loss is high, then the reassignment will not be done to prevent degradation in UE performance. This is done by defining a second condition (C2) to check if a(i) is less than a threshold Th2 (the loss in signal strength meets preset condition 2). If this is the case, then the loss in performance is minimal and hence the small cell can be switched off and the UE reassigned. If not, then the loss in performance is not minimal and the small cell is not switched off.

Figure 6:
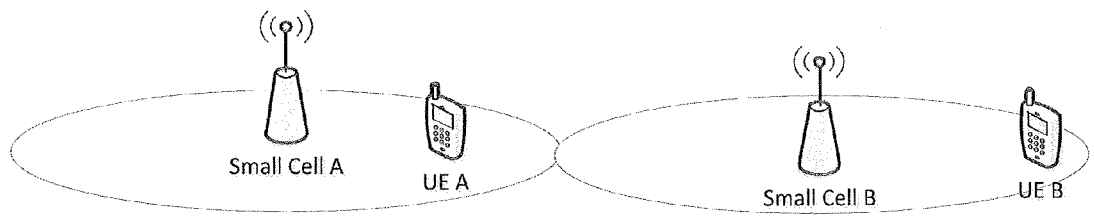
Figure 7:
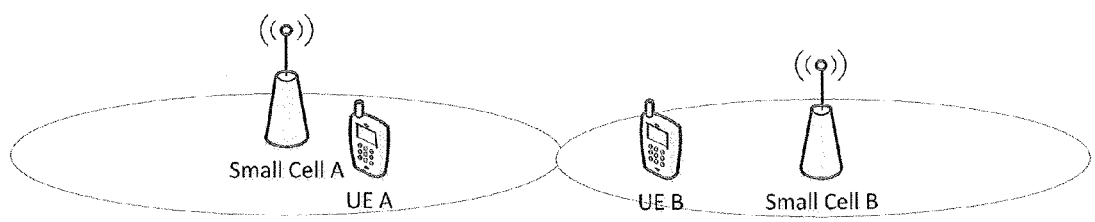
Figure 8:
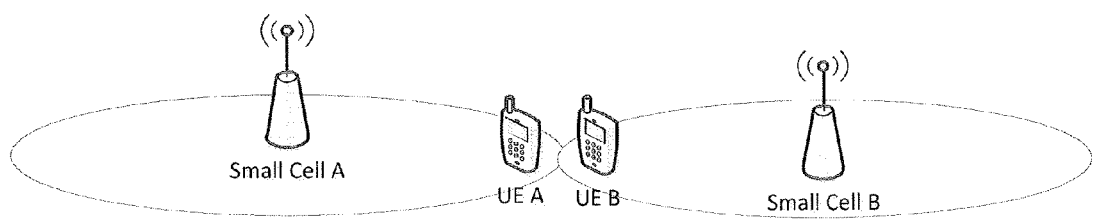
FIG. 8 is an illustration of a scenario in which C1='YES' and C2='YES' and small cell is switched OFF.

The significance of conditions C1 (defined in step 5) and C2 (defined in step 7) are now clarified with some illustrations using FIGS. 6-8. They show two small cells A and B that have one UE each in their respective coverage areas (UE A and UE B respectively for small cell A and small cell B). We shall apply conditions C1 and C2 on small cell A and decide whether it should be switched off or not. In case small cell A is switched off, then UE A is reassigned to small cell B.

FIG. 6 is an illustration of a scenario in which C1='NO' (interference metric I(j) is below threshold Th1) and small cell is switched ON. In FIG. 6, UE B is far away from small cell A and hence small cell A causes little interference to UE B. Hence C1='NO' and there is no need to switch off small cell A to protect UE B.

FIG. 7 is an illustration of a scenario in which C1='YES' and C2='NO' (loss in signal strength by switching off small cell is not less than threshold Th2) and small cell is switched ON. In FIG. 7, UE B is now closer to small cell A and small cell A causes more interference to UE B than the previous case considered in FIG. 6. Hence C1='YES.' However, UE A is also close to small cell A and has strong signal strength. If small cell A is switched off to protect UE B from interference, UE A is reassigned to small cell B. Since small cell B is far away from UE A, UE A suffers loss in performance. Hence condition C2='NO.' As a result, small cell A is not switched off.

FIG. 8 is an illustration of a scenario in which C1='YES' and C2='YES' and small cell is switched OFF. In FIG. 8, similar to the case in FIG. 7, small cell A causes significant interference to UE B and hence C1='YES.' UE A is a cell edge UE and has roughly the same DL signal strength from both small cells A & B. If UE A is reassigned to small cell B, there is no significant loss in performance. Hence C2='YES.' In this case, small cell A can be switched off.

Figure 9:
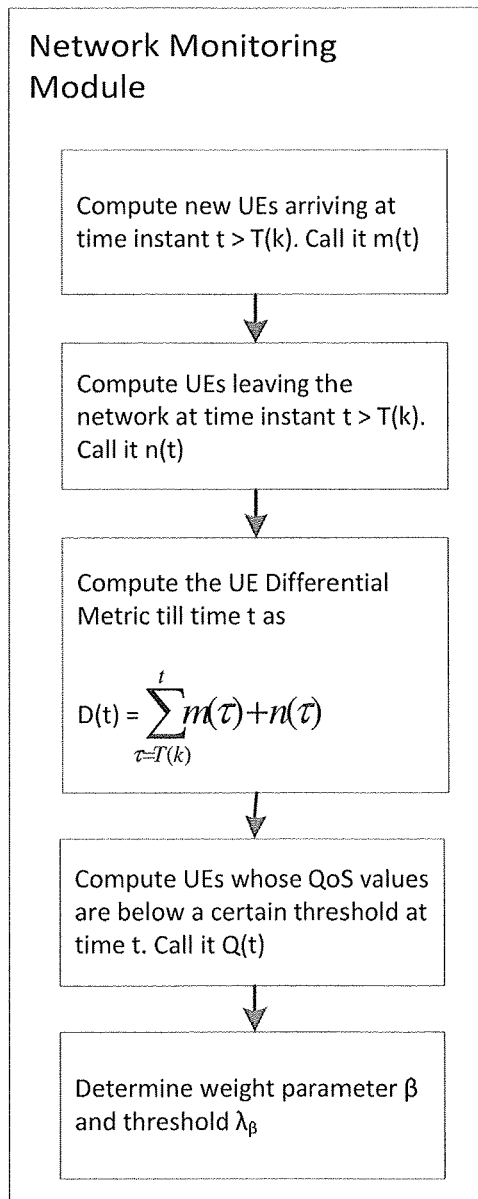
FIG. 9 shows an example of a flow diagram of the Network Monitoring Module of the macro.

FIG. 9 shows an example of a flow diagram of the Network Monitoring Module of the macro. It has the following functionalities:

(1) The module determines the new UEs that have joined the system at time t at t>T(k) where T(k) is the time of the kth network configuration time. Call this m(t). Note that since these UEs arrived after the network had been configured (and before the next configuration instant), they are connected only to the macro.

(2) The module determines the UEs that have left the system at time t. Call this n(t).

(3) For time t, the module defines the differential change in the number of UEs in the network as m(t)+n(t). The total differential change since the last time the network was configured is obtained by adding this metric for all time instants from T(k) to t. Call this metric D(t).

(4) From the channel state information and hybrid ARQ ACK/NACK information of already scheduled transmissions for each UE (as provided by the Baseband Signal Processing Module in FIG. 4), the module determines the number of UEs whose QoS is below a certain threshold at time t. Call it Q(t).

(5) The module determines a weighing parameter β between 0 and 1 to give relative importance to D(t) and Q(t) and a threshold A.

Figure 10:
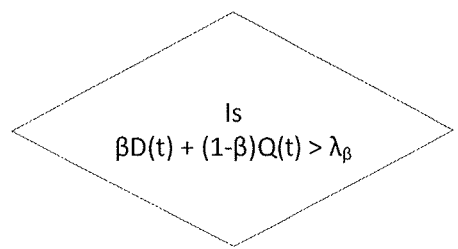
FIG. 10 shows an example of the Network Reconfiguration module.

These values are passed to the Network Reconfiguration module which is shown in FIG. 10. It computes the metric βD(t)+(1−β)Q(t) which considers the importance of both D(t) and Q(t). Higher β gives more importance to D(t). If this metric is above a threshold $\lambda_\beta$, then the module decides to reconfigure the network again. This is because there have been sufficient change in the network (existing UEs are experiencing low QoS and/or new UEs have come in who need to be connected to small cells and/or UEs have left the system and hence some small cells have less UEs) and a reconfiguration is needed.

Of course, the communications system shown in FIG. 2 and the functional block diagram illustrated in FIG. 4 are purely exemplary of systems in which the present invention may be implemented, and the invention is not limited to a particular hardware or software configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for dual connectivity of user equipment to macro and to small cell in LTE systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A macro base station in a communications system which includes the macro base station, a plurality of UEs (user equipment), a plurality of small cells, and a network through which the macro base station, the UEs, and the small cells communicate with each other, the plurality of small cells within a macro coverage area of the macro base station, the macro base station comprising:

a processor, a memory, and a small cell on/off module which is operable, for each small cell of the plurality of small cells, to:

determine an interference metric for the small cell;

if the determined interference metric meets a preset condition for the small cell, then determine a loss in signal strength to the UEs associated with the small cell caused by switching off the small cell; and judge whether to switch off the small cell based on at least one of the determined interference metric or the determined loss in signal strength, wherein for each UE i, the small cell on/off module is operable to determine a small cell j of the plurality of small cells that has a highest downlink reference signal received power (DL RSRP) value to the UE i, and the UE i would normally connect to the small cell j given by M(i)=argmaxi S(UEi, SCj), where UEi stands for UE i and SCj stands for small cell j, wherein for each small cell j, the small cell on/off module is operable to determine a set of UEs i, which would normally connect to the small cell j based on highest DL RSRP value, the set of UEs being denoted by N(j)={i|j=M(i)}, wherein for each small cell j, the small cell on/off module is operable to check if the set of UEs N(j) is empty or not and, if empty, then to switch off the small cell j, wherein if the set of UEs N(j) is not empty, then the small cell on/off module is operable to define the interference metric for small cell j as I(j)=Σi≠N(i) S(UEi, SCj), which sums up the DL RSRP values to all UEs which are not in N(j), and wherein the small cell on/off module is operable to check if the interference metric I(j) for the small cell j is above a preset first threshold and, if not, then to judge that the small cell j is not to be switched off.

2. The macro base station according to claim 1, wherein if the interference metric I(j) for the small cell j is above the preset first threshold, the small cell on/off module is operable to calculate the loss in signal strength caused by switching off the small cell j for each UE i, which is given by $$a(i)=|S(UEi,SCj)-\max_{k\neq j} S(UEi,SCk)|;$$

wherein if the calculated loss in signal strength is less than a preset second threshold, the small cell on/off module is operable to judge that the small cell j is to be switched off; and wherein if the calculated loss in signal strength is not less than the preset second threshold, the small cell on/off module is operable to judge that the small cell j is not to be switched off.

3. The macro base station according to claim 1, further comprising:

a radio RRM (Radio Resource Management) module operable (i) to send a message to the plurality of small cells instructing the small cells to broadcast discovery signals which are received by RRM modules in the UEs, the RRM module in each UE i calculating the received DL RSRP value from each small cell j, as denoted by S(UEi, SCj), and (ii) to receive the calculated DL RSRP value denoted by S(UEi, SCj).

4. The macro base station according to claim 1, further comprising:

a network monitoring module being operable, based on (i) a differential change in a number of UEs in the communications system in a preset period of time and (ii) a number of UEs whose QoS (quality of service) is below a preset QoS threshold, to decide when to reconfigure the network which includes instructing small cells to broadcast discovery signals, determining the interference metric for the small cell, determining the loss in signal strength if the determined interference metric meets the preset condition, and judging whether to switch off the small cell.

5. The macro base station according to claim 4, wherein the network monitoring module is operable to determine a number of new UEs that have joined the communications system at time t at t>T(k) where T(k) is time of kth network configuration time, the number of new UEs being m(t); determine a number of UEs that have left the communications system at time t, the number of UEs that have left being n(t); for time t, define the differential change in the number of UEs in the communications system as m(t)+n(t); and sum the differential change m(t)+n(t) for all time instants from T(k) to t to obtain a UE differential metric D(t); and wherein the small cell on/off module is operable to determine, from channel state information and hybrid ARQ (Automatic Repeat Request) ACK/NACK (Acknowledge receipt of data/Not Acknowledged) information of already scheduled transmissions for each UE, the number of UEs whose QoS is below the preset QoS threshold at time t, as denoted by Q(t).

6. The macro base station according to claim 5, further comprising a network reconfiguration module operable to determine a weighing parameter β between 0 and 1 to give relative importance to D(t) and Q(t) and a threshold λβ, and, if βD(t)+(1−β)Q(t)>λβ, to reconfigure the network.

7. A communications system comprising:
a macro base station;
a plurality of UEs (user equipment);
a plurality of small cells; and
a network through which the macro base station, the UEs, and the small cells communicate with each other, the plurality of small cells within a macro coverage area of the macro base station, wherein the macro base station includes a processor, a memory, and a small cell on/off module which is operable, for each small cell of the plurality of small cells, to:
determine an interference metric for the small cell;
if the determined interference metric meets a preset condition for the small cell, then determine a loss in signal strength to the UEs associated with the small cell caused by switching off the small cell; and
judge whether to switch off the small cell based on at least one of the determined interference metric or the determined loss in signal strength, wherein for each UE i, the small cell on/off module is operable to determine a small cell j of the plurality of small cells that has a highest downlink reference signal received power (DL RSRP) value to the UE i, and the UE i would normally connect to the small cell j given by M(i)=argmaxi S(UEi, SCj), where UEi stands for UE i and SCj stands for small cell j, wherein for each small cell j, the small cell on/off module is operable to determine a set of UEs i, which would normally connect to the small cell j based on highest DL RSRP value, the set of UEs being denoted by N(j)={i|j=M(i)}, wherein for each small cell j, the small cell on/off module is operable to check if the set of UEs N(j) is empty or not and, if empty, then to switch off the small cell j, wherein if the set of UEs N(j) is not empty, then the small cell on/off module is operable to define the interference metric for small cell j as I(j)=Σi∉N(j) S(UEi, SCj), which sums up the DL RSRP values to all UEs which are not in N(j), wherein the small cell on/off module is operable to check if the interference metric I(j) for the small cell j is above a preset first threshold and, if not, then to judge that the small cell j is not to be switched off, wherein if the interference metric I(j) for the small cell j is above the preset first threshold, the small cell on/off module is operable to calculate the loss in signal strength caused by switching off the small cell j for each UE i, which is given by $$a(i)=|S(UEi,SCj)-\max_{k\neq j} S(UEi,SCk)|,$$

wherein if the calculated loss in signal strength is less than a preset second threshold, the small cell on/off module is operable to judge that the small cell j is to be switched off, and wherein if the calculated loss in signal strength is not less than the preset second threshold, the small cell on/off module is operable to judge that the small cell j is not to be switched off.

8. The communications system according to claim 7, wherein the macro base station further comprises:

a network monitoring module being operable, based on (i) a differential change in a number of UEs in the communications system in a preset period of time and (ii) a number of UEs whose QoS (quality of service) is below a preset QoS threshold, to decide when to reconfigure the network which includes instructing small cells to broadcast discovery signals, determining the interference metric for the small cell, determining the loss in signal strength if the determined interference metric meets the preset condition, and judging whether to switch off the small cell.

9. The communications system according to claim 8, wherein the network monitoring module is operable to determine a number of new UEs that have joined the communications system at time t at t>T(k) where T(k) is time of kth network configuration time, the number of new UEs being m(t); determine a number of UEs that have left the communications system at time t, the number of UEs that have left being n(t); for time t, define the differential change in the number of UEs in the communications system as m(t)+n(t); and sum the differential change m(t)+n(t) for all time instants from T(k) to t to obtain a UE differential metric D(t);

wherein the small cell on/off module is operable to determine, from channel state information and hybrid ARQ (Automatic Repeat Request) ACK/NACK (Acknowledge receipt of data/Not Acknowledged) information of already scheduled transmissions for each UE, the number of UEs whose QoS is below the preset QoS threshold at time t, as denoted by Q(t);

wherein the macro base station further comprises a network reconfiguration module operable to determine a weighing parameter β between 0 and 1 to give relative importance to D(t) and Q(t) and a threshold λβ, and, if βD(t)+(1−β)Q(t)>λβ, to reconfigure the network.

10. A method for providing connectivity in a communications system which includes a macro base station, a plurality of UEs (user equipment), a plurality of small cells, and a network through which the macro base station, the UEs, and the small cells communicate with each other, the plurality of small cells within a macro coverage area of the macro base station, the macro base station comprising:
a processor and a memory, the method comprising, for each small cell of the plurality of small cells:
determining an interference metric for the small cell;
if the determined interference metric meets a preset condition for the small cell, then determining a loss in signal strength to the UEs associated with the small cell caused by switching off the small cell;
judging whether to switch off the small cell based on at least one of the determined interference metric or the determined loss in signal strength;
for each UE i, determining a small cell j of the plurality of small cells that has a highest downlink reference signal received power (DL RSRP) value to the UE i, wherein the UE i would normally connect to the small cell j given by M(i)=argmaxi S(UEi, SCj), where UEi stands for UE i and SCj stands for small cell j;
for each small cell j, determining a set of UEs i, which would normally connect to the small cell j based on highest DL RSRP value, the set of UEs being denoted by N(j)={i|j=M(i)}; and
for each small cell j, checking if the set of UEs N(j) is empty or not and, if empty, then switching off the small cell j.

11. The method according to claim 10, further comprising:
if the set of UEs N(j) is not empty, then defining the interference metric for small cell j as I(j)=Σi∉N(j) S(UEi, SCj), which sums up the DL RSRP values to all UEs which are not in N(j); and checking if the interference metric I(j) for the small cell j is above a preset first threshold and, if not, then judging that the small cell j is not to be switched off.

12. The method according to claim 11, further comprising:
if the interference metric I(j) for the small cell j is above the preset first threshold, calculating the loss in signal strength caused by switching off the small cell j for each UE i, which is given by $a(i)=|S(UEi,SCj)-\max_{k \neq j} S(UEi,SCk)|;$ if the calculated loss in signal strength is less than a preset second threshold, judging that the small cell j is to be switched off; and
if the calculated loss in signal strength is not less than the preset second threshold, judging that the small cell j is not to be switched off.

13. The method according to claim 10, further comprising:
sending a message to the plurality of small cells instructing the small cells to broadcast discovery signals which are received by RRM modules in the UEs, the RRM module in each UE i calculating the received DL RSRP value from each small cell j, as denoted by S(UEi, SCj); and
receiving the calculated DL RSRP value denoted by S(UEi, SCj).

14. The method according to claim 10, further comprising:
based on (i) a differential change in a number of UEs in the communications system in a preset period of time and (ii) a number of UEs whose QoS (quality of service) is below a preset QoS threshold, deciding when to reconfigure the network which includes instructing small cells to broadcast discovery signals, determining the interference metric for the small cell, determining the loss in signal strength if the determined interference metric meets the preset condition, and judging whether to switch off the small cell.

15. The method according to claim 14, further comprising:
determining a number of new UEs that have joined the communications system at time t at t>T(k) where T(k) is time of kth network configuration time, the number of new UEs being m(t); determining a number of UEs that have left the communications system at time t, the number of UEs that have left being n(t); for time t, defining the differential change in the number of UEs in the communications system as m(t)+n(t); and summing the differential change m(t)+n(t) for all time instants from T(k) to t to obtain a UE differential metric D(t); and
determining, from channel state information and hybrid ARQ (Automatic Repeat Request) ACK/NACK (Acknowledge receipt of data/Not Acknowledged) information of already scheduled transmissions for each UE, the number of UEs whose QoS is below the preset QoS threshold at time t, as denoted by Q(t).

16. The method according to claim 15, further comprising:
determining a weighing parameter β between 0 and 1 to give relative importance to D(t) and Q(t) and a threshold λβ; and
if βD(t)+(1−β)Q(t)>λβ, reconfiguring the network.

* * * * *